United States Patent
Kolte et al.

(10) Patent No.: US 11,154,007 B2
(45) Date of Patent: Oct. 26, 2021

(54) HARVESTER CUTTERBAR KNIFE DRIVE WITH CYLINDRICAL CAM OR SELF REVERSING LEAD SCREW MECHANISM

(71) Applicant: Deere & Company, Moline, IL (US)

(72) Inventors: Parag Kolte, Pune (IN); Prathamesh Dhoke, Pune (IN); Prashant Jundale, Solapur (IN); Shreyas P. Modak, Thane (IN)

(73) Assignee: Deere & Company, Moline, IL (US)

( * ) Notice: Subject to any disclaimer, the term of this patent is extended or adjusted under 35 U.S.C. 154(b) by 274 days.

(21) Appl. No.: 16/114,024

(22) Filed: Aug. 27, 2018

(65) Prior Publication Data

US 2020/0060078 A1 Feb. 27, 2020

(51) Int. Cl.
| | |
|---|---|
| *A01D 34/30* | (2006.01) |
| *A01D 34/04* | (2006.01) |
| *A01D 34/135* | (2006.01) |
| *A01D 34/14* | (2006.01) |

(52) U.S. Cl.
CPC ........... *A01D 34/30* (2013.01); *A01D 34/046* (2013.01); *A01D 34/135* (2013.01); *A01D 34/145* (2013.01)

(58) Field of Classification Search
CPC .... A01D 34/30; A01D 34/046; A01D 34/135; A01D 34/145; A01D 34/02; A01D 34/04; A01D 41/14; A01D 34/32; A01D 34/33; A01D 34/34
USPC .......................... 56/10.1, 13.6, 257, 259, 296
See application file for complete search history.

(56) References Cited

U.S. PATENT DOCUMENTS

| | | | |
|---|---|---|---|
| 1,230,710 A * | 6/1917 | Hill ........................ | A01D 34/02 56/259 |
| 1,880,121 A | 9/1932 | Chadbourne | |
| 2,630,670 A | 3/1953 | Sherman | |
| 9,545,052 B2 * | 1/2017 | Cook ..................... | A01D 34/30 |
| 2007/0204586 A1 | 9/2007 | Coers | |

(Continued)

FOREIGN PATENT DOCUMENTS

| | | |
|---|---|---|
| EP | 0603843 A1 | 6/1994 |
| FR | 501303 A | 4/1920 |
| NI | 8303420 A | 5/1985 |

OTHER PUBLICATIONS

European Search Report issued in counterpart European Patent Application No. 19192513.0 dated Jan. 22, 2020 (6 pages).

(Continued)

*Primary Examiner* — Adam J Behrens
(74) *Attorney, Agent, or Firm* — Foley & Lardner LLP

(57) ABSTRACT

A cutting assembly for an agricultural harvesting head is provided. The cutting assembly includes a first cutterbar, a second cutterbar, and a knife drive gearbox configured to drive linear reciprocating motion of the first cutterbar and the second cutterbar. The gearbox includes a cam shaft extending along a rotational axis from a first end to a second end. The cam shaft includes a first cam follower groove located near the first end and a second cam follower groove located near the second end. The gearbox further includes a drive mechanism, a first output shaft coupled to a first cam follower that travels in the first cam follower groove, and a second output shaft coupled to a second cam follower that travels in the second cam follower groove. The first output shaft is coupled to the first cutterbar and the second output shaft is coupled to the second cutterbar.

20 Claims, 12 Drawing Sheets

(56) References Cited

U.S. PATENT DOCUMENTS

| | | |
|---|---|---|
| 2009/0145097 A1 | 6/2009 | Priepke |
| 2009/0145264 A1 | 6/2009 | Priepke |
| 2011/0099964 A1* | 5/2011 | Goers .................... A01D 41/14 56/296 |
| 2018/0192582 A1 | 7/2018 | Lounder et al. |

OTHER PUBLICATIONS

European Search Report issued in European Patent Application No. 19191038.9 dated Jan. 30, 2020 (11 pages).

* cited by examiner

HARVESTER CUTTERBAR KNIFE DRIVE WITH CYLINDRICAL CAM OR SELF REVERSING LEAD SCREW MECHANISM

FIELD OF THE DISCLOSURE

The present application relates generally to the field of agricultural harvesting equipment. More particularly, it relates to an agricultural harvesting head having a central knife drive gearbox with a self-reversing lead screw.

BACKGROUND

Grain harvesting operations for crops such as wheat, soybeans, and rice are often completed by agricultural machines that include multiple reciprocating knives at the leading edge of the machine. The reciprocating knives sever the crop plants at their roots, permitting the harvested crops to fall onto one or more conveyor belts before they are transported into a feederhouse for processing and storage.

Often, harvesting heads feature reciprocating knives driven by a central gearbox and a pair of 90° gearboxes. The 90° gearboxes may be located at the outermost edges of the harvesting head, which may require multiple linkages and drives, and may result in cut crops becoming trapped in the 90° gearboxes. The extra components and weight associated with the 90° gearboxes increase the cost and complexity of the harvester while simultaneously degrading its performance. Other methods of driving reciprocating knives may include hydraulic systems prone to slippage and losses in power transmission. Hydraulic systems may also require additional assembly and service time as compared with non-hydraulic systems.

SUMMARY

In accordance with one aspect of an embodiment described herein, a cutting assembly for an agricultural harvesting head is provided. The cutting assembly includes a first cutterbar, a second cutterbar, and a knife drive gearbox configured to drive linear reciprocating motion of the first cutterbar and the second cutterbar. The gearbox includes a cam shaft extending along a rotational axis from a first end to a second end. The cam shaft includes a first cam follower groove located near the first end and a second cam follower groove located near the second end. The gearbox further includes a drive mechanism, a first output shaft coupled to a first cam follower that travels in the first cam follower groove, and a second output shaft coupled to a second cam follower that travels in the second cam follower groove. The first output shaft is coupled to the first cutterbar and the second output shaft is coupled to the second cutterbar.

The drive mechanism may be coupled to the first end of the cam shaft. The drive mechanism may be disposed beneath the cam shaft between the first end and the second end. The knife drive gearbox may drive the first cutterbar and the second cutterbar in opposite directions relative to each other during operation. The knife drive gearbox may drive the first cutterbar and the second cutterbar in the same direction relative to each other during operation.

The drive mechanism may include a chain drive mechanism, a gear drive mechanism, or a belt drive mechanism. The first cam follower groove may be symmetrical to the second cam follower groove. The cutting assembly may include a third output shaft and a fourth output shaft. The third output shaft may be coupled to the first cutterbar and the fourth output shaft may be coupled to the second cutterbar.

In accordance with another aspect of the embodiment described herein, an agricultural harvesting head is provided. The agricultural harvesting head includes a frame that extends laterally, a belt conveyor configured to be supported on the frame and driven in a lateral direction, and a cutting assembly configured to be supported on the frame. The cutting assembly includes a cutterbar that extends laterally and a knife drive gearbox configured to drive linear reciprocating motion of the cutterbar. The knife drive gearbox includes a cam shaft extending along a rotational axis from a first end to a second end. The cam shaft includes a first cam follower groove located near the first end and a second cam follower groove located near the second end. The knife drive gearbox further includes a drive mechanism, a first output shaft coupled to a first cam follower that travels in the first cam follower groove, and a second output shaft coupled to a second cam follower that travels in the second cam follower groove. The first output shaft is coupled to the cutterbar at a first mounting point and the second output shaft is coupled to the cutterbar at a second mounting point.

The drive mechanism may be coupled to the first end of the cam shaft. The drive mechanism may be disposed beneath the cam shaft between the first end and the second end.

The drive mechanism may include a chain drive mechanism, a gear drive mechanism, or a belt drive mechanism. The cutting assembly may include a third output shaft coupled to the cutterbar at the first mounting point and a fourth output shaft coupled to the cutterbar at the second mounting point.

In accordance with yet another aspect of an embodiment described herein, a method of operating a cutting assembly for an agricultural harvesting head is provided. The method includes providing a first cutterbar, providing a second cutterbar, and providing a knife drive gearbox that is configured to drive linear reciprocating motion of the first cutterbar and the second cutterbar. The knife drive gearbox includes a cam shaft extending along a rotational axis from a first end to a second end. The cam shaft includes a first cam follower groove located near the first end and a second cam follower groove located near the second end. The knife drive gearbox further includes a drive mechanism, a first output shaft coupled to a first cam follower that travels in the first cam follower groove, and a second output shaft coupled to a second cam follower that travels in the second cam follower groove. The first output shaft is coupled to the first cutterbar and the second output shaft is coupled to the second cutterbar.

The drive mechanism may be coupled to the first end of the cam shaft. The drive mechanism may be disposed beneath the cam shaft between the first end and the second end. The knife drive gearbox may drive the first cutterbar and the second cutterbar in opposite directions relative to each other during operation. The knife drive gearbox may drive the first cutterbar and the second cutterbar in the same direction relative to each other during operation.

The drive mechanism may include a chain drive mechanism, a gear drive mechanism, or a belt drive mechanism. The cutting assembly may include a third output shaft coupled to the first cutterbar and a fourth output shaft coupled to the second cutterbar.

BRIEF DESCRIPTION OF THE DRAWINGS

Exemplary embodiments will become more fully understood from the following detailed description, taken in conjunction with the accompanying drawings, wherein like reference numerals refer to like elements, and.

DETAILED DESCRIPTION

Referring generally to the FIGURES, a central knife drive gearbox with a self-reversing lead screw for a harvesting head is depicted, according to various embodiments. The gearbox is configured to receive rotational input from a drive mechanism and output reciprocating linear motion to one or more cutterbars in a cutterbar assembly. The reciprocating linear motion is achieved through a self-reversing screw/cam shaft and a system of cam followers and output shafts. Use of the central knife drive gearbox reduces the number of components and overall mass required to drive the cutterbar(s), resulting in improved performance of the harvesting head.

Figure 1:
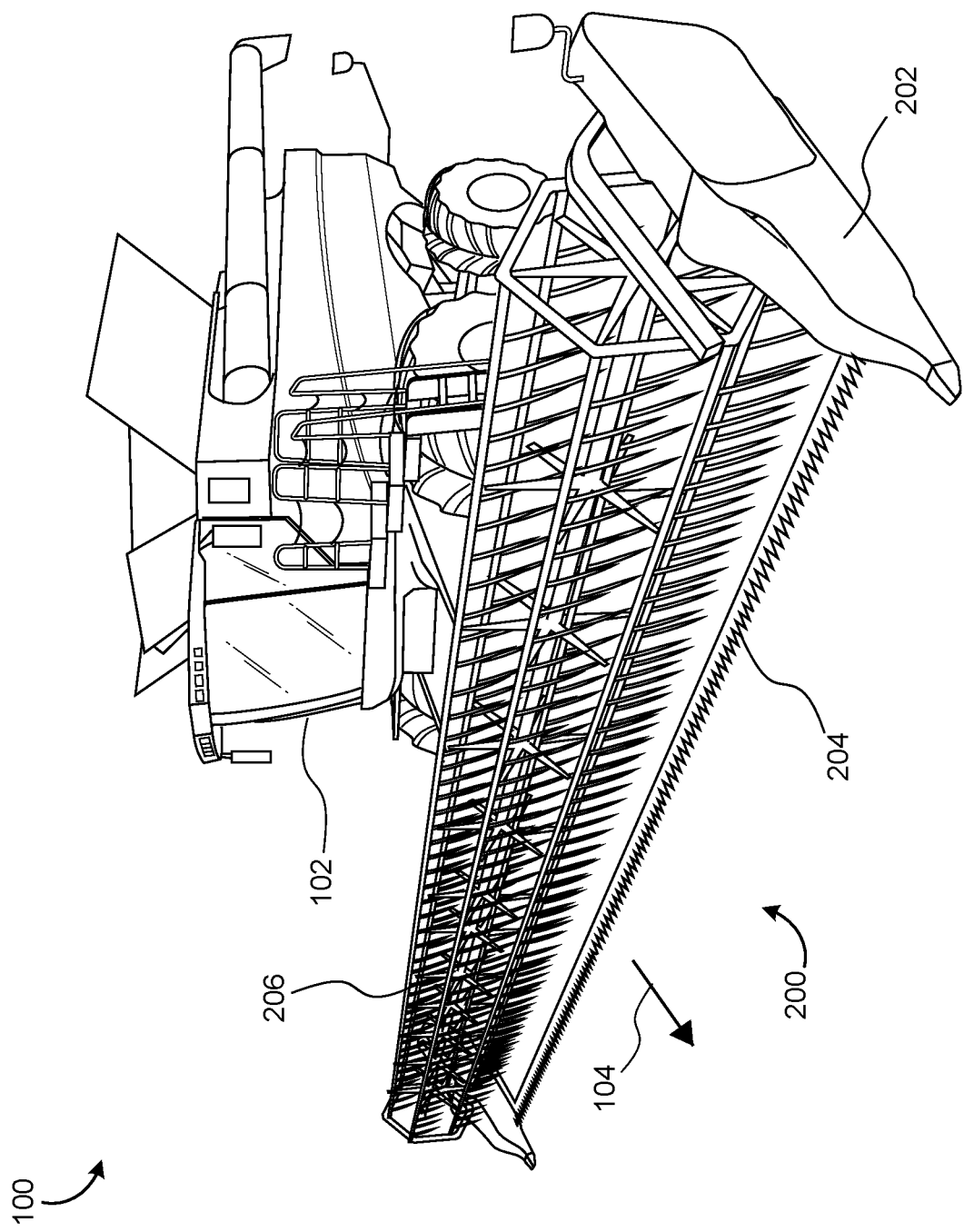
FIG. 1 is a perspective view of an agricultural harvester, according to some embodiments.

Referring to FIG. 1, an agricultural harvester 100 is depicted, according to some embodiments. Agricultural harvester 100 includes a combine 102 and a harvesting head assembly 200 supported on the front of the combine 102. The harvesting head assembly 200 includes a frame 202 that extends laterally across substantially the entire width of the harvesting head assembly 200.

As the agricultural harvester 100 travels in the direction indicated by the arrow 104, the reciprocating cutterbar assembly 204 is configured to sever crop plants at their roots, thereby freeing them from the soil. In some embodiments, agricultural harvesting head 200 also includes a reel assembly 206 that is pivotally coupled to the frame 202 and includes metal or plastic teeth that grip plant stalks and push them towards the cutterbar assembly 204. Once severed, the plants are directed upward and rearward via a crop ramp until they fall onto a belt conveyor. In some embodiments, the harvesting head 200 includes a left side belt conveyor, a right side belt conveyor, and a central belt conveyor. Crops deposited onto a left side belt conveyor or a right side belt conveyor are transported to the center of the harvesting head 200 and onto a central belt conveyor, which may be configured to carry the crops rearward, underneath a feed drum and into a feederhouse. The feederhouse may be configured to transmit the harvested crop material into the combine 102 for further processing and storage.

Figure 2:
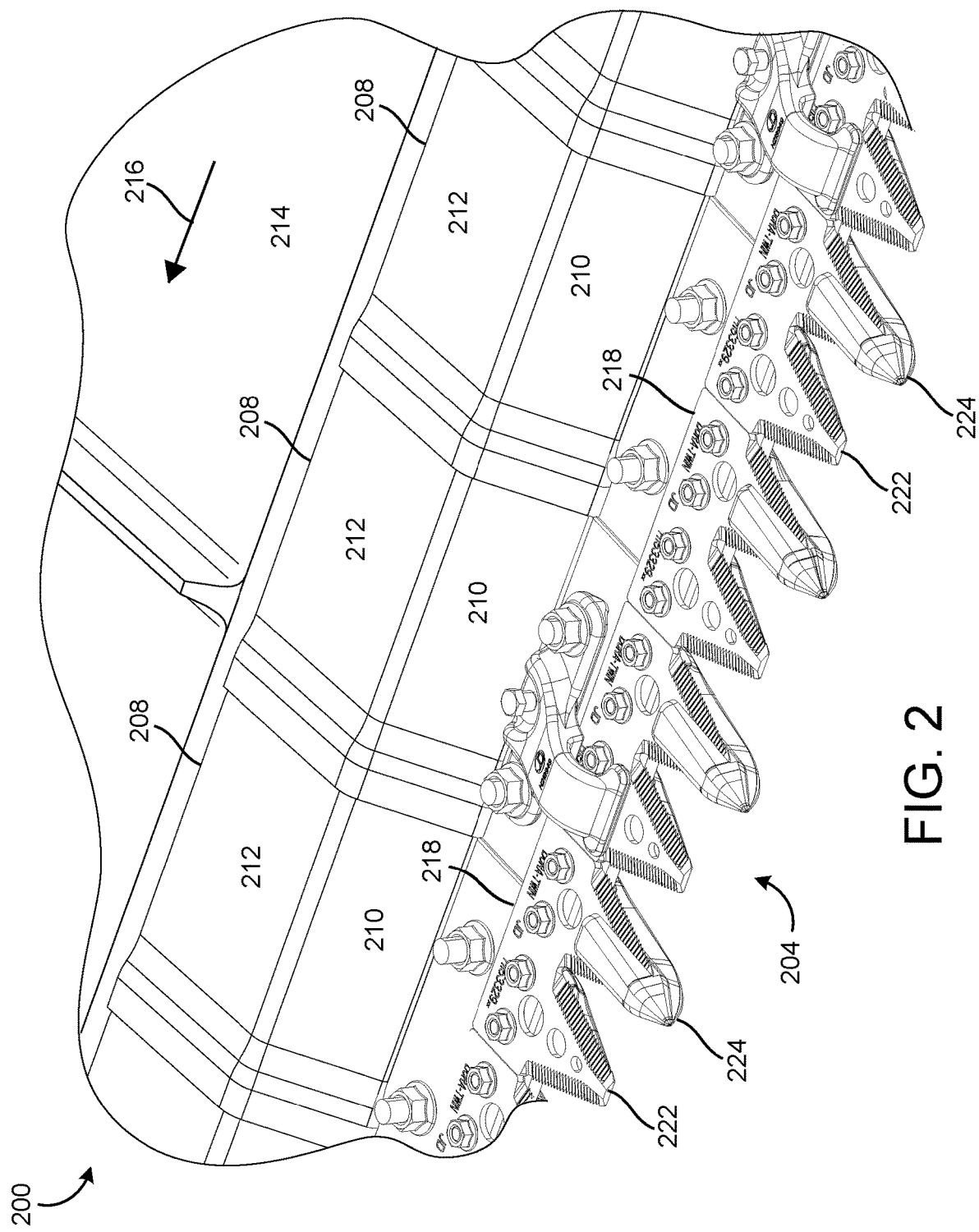
FIG. 2 is a detail view of the agricultural harvester of FIG. 1, according to some embodiments.

Referring now to FIG. 2, a detail view of agricultural harvesting head 200 is depicted, according to some embodiments. Although FIG. 2 specifically depicts a left side portion of the harvesting head 200, is should be understood that the left side portion and the right side portion may be symmetrical, and all description included below with reference to interaction of components may be equally applicable to the right side portion. As shown, in some embodiments, the agricultural harvesting head 200 includes multiple crop ramp segments 208 that guide harvested crops for deposit onto the belt conveyor 214. Belt conveyor 214 may transport the harvested crops toward a central belt conveyor in the direction indicated by the arrow 216. Each crop ramp segment 208 is shown to include a forward portion 210 that is generally planar and upwardly inclined (in a front-to-rear direction). A rear portion 212 that is generally planar and parallel to the belt conveyor 214 extends from the forward portion 210. In some embodiments, each crop ramp segment 208 may be configured to engage with two adjacent crop ramp segments 208 such that a continuous crop ramp surface is provided that extends across substantially the entire width of the harvesting head 200. In other embodiments, the harvesting head 200 includes a single crop ramp segment 208 that extends across substantially the entire width of the head 200.

The cutterbar assembly 204 includes at least one cutterbar 218 with a plurality of knives 222. The particular type of knife can vary, and may include single blade knife configurations or double blade knife configurations, as is depicted in FIG. 2. A plurality of knife guards 224 may be positioned in opposition to the knives 222 to provide opposing surfaces for cutting the crop material with knives 222. The cutterbar 218 may be formed from a flexible metal that permits a certain desired degree of flexure across the length of the harvesting head 200. As described in further detail below with reference to FIG. 8, in some embodiments, the cutterbar assembly 204 includes a first cutterbar and a second cutterbar, with each cutterbar simultaneously driven by a single knife drive, providing reciprocating movements.

Figure 3:
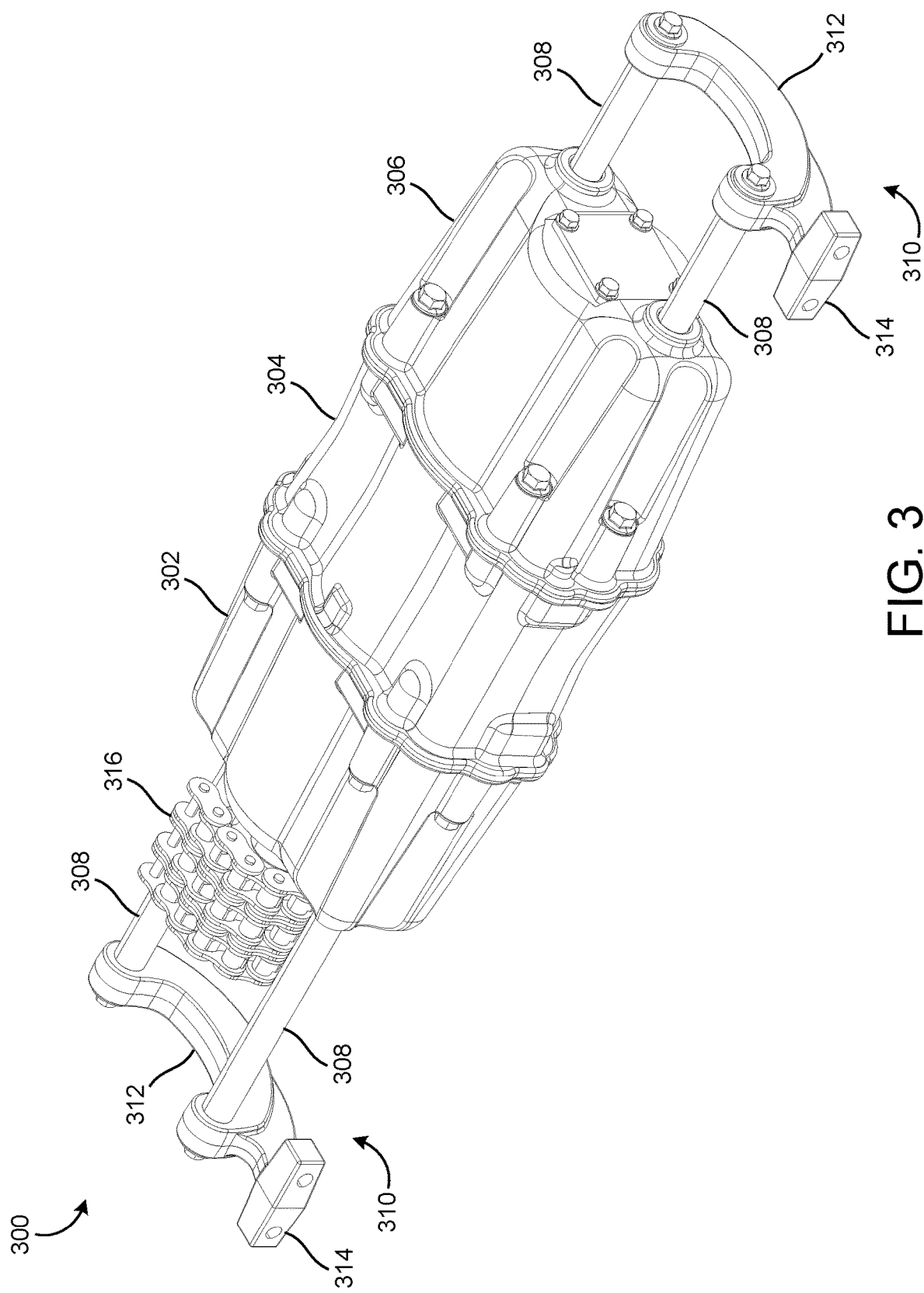
FIG. 3 is a perspective view of a central knife drive gearbox used in the agricultural harvester of FIG. 1, according to some embodiments.

Turning now to FIG. 3, a perspective view of a central knife drive gearbox 300 is depicted, according to some embodiments. The central knife drive gearbox 300 is configured to receive rotational input motion and output reciprocating linear motion to a cutterbar assembly (e.g., cutterbar assembly 204). Linear motion results in the most efficient harvesting of crops as compared with harvesting heads that utilize cutterbar assemblies with curved motion.

Gearbox 300 is shown to include a first end housing portion 302, a central housing portion 304, and a second end housing portion 306. Housing portions 302-306 partially encapsulate reciprocating output shafts 308. As shown, in some embodiments, two output shafts 308 extend from the first end housing portion 302 and two output shafts 308 extend from the second end housing portion 306. In other embodiments, a single output shaft 308 may extend from each of the first and second end housing portions 302 and 306.

The reciprocating output shafts 308 may be fixedly attached to cutterbar coupling members 310. Each cutterbar coupling member 310 may include a substantially U-shaped portion 312 and a cutterbar head joint portion 314. The U-shaped portion 312 may be configured to couple to two output shafts 308 extending from either the first end housing portion 302 or the second end housing portion 306 using any suitable fastening method (e.g., fasteners, welding). Similarly, the cutterbar head joint portion 314 may be coupled to a corresponding cutterbar using any suitable fastening method such that translational movement of the reciprocating output shafts 308 results in translational movement of the cutterbar.

In some embodiments and as depicted in FIG. 3, the motion of the reciprocating output shafts 308 is driven by a chain drive 316 that provides rotational input power to the gearbox 300. However, in other embodiments, the central knife drive gearbox 300 is driven by a different type of positive or friction drive (e.g., a gear drive, a belt drive, a pulley drive). Power for the drive 316 may be transferred under or alongside the central belt conveyor of the harvesting head 200. Thus, it may be advantageous for central knife drive gearbox 300 to be located near the center of the harvesting head 200, although gearbox 300 may be located at any point along the width of the harvesting head 200.

Figure 4:
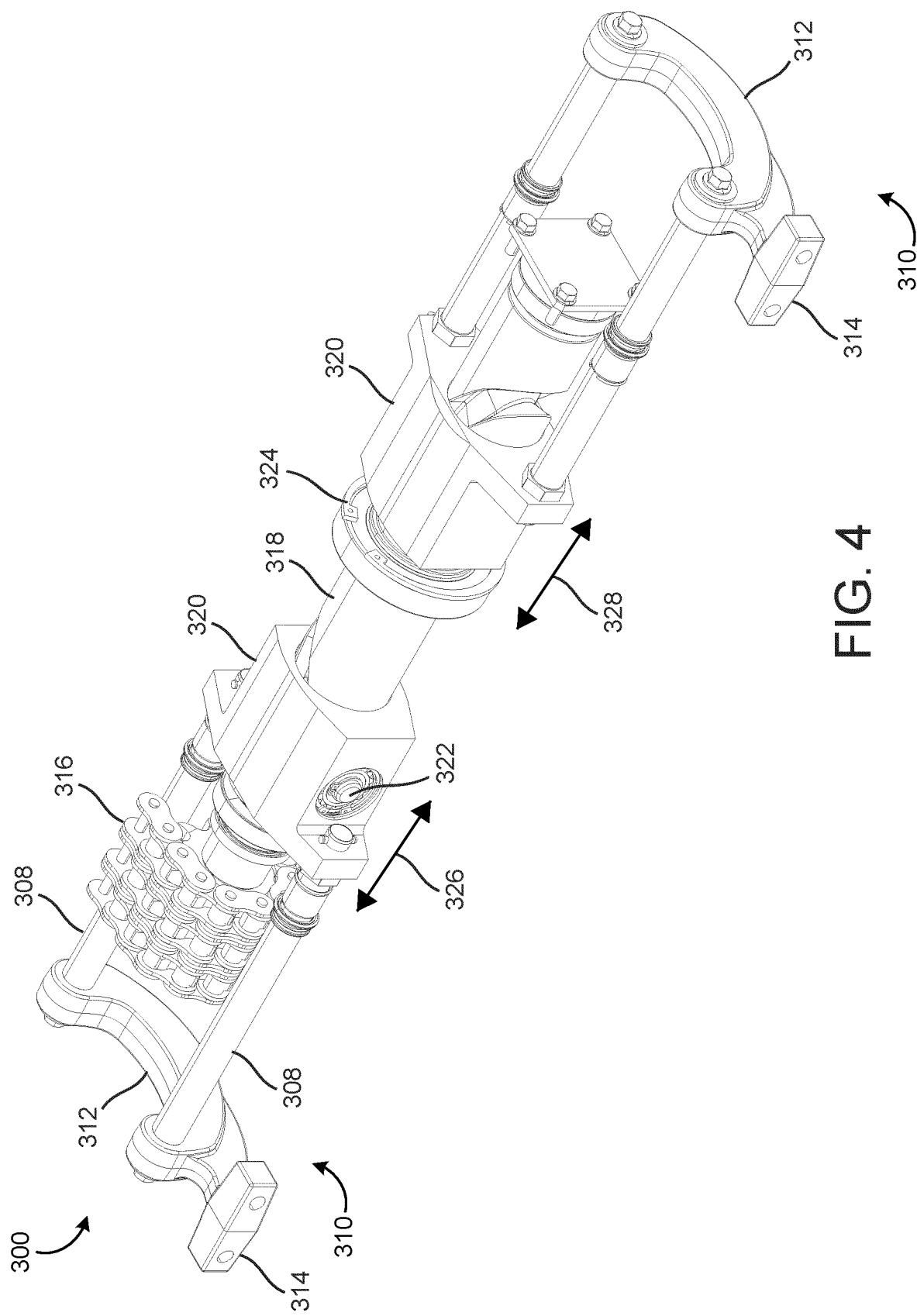
FIG. 4 is another perspective view of the central knife drive gearbox of FIG. 3, according to some embodiments.
Figure 5:
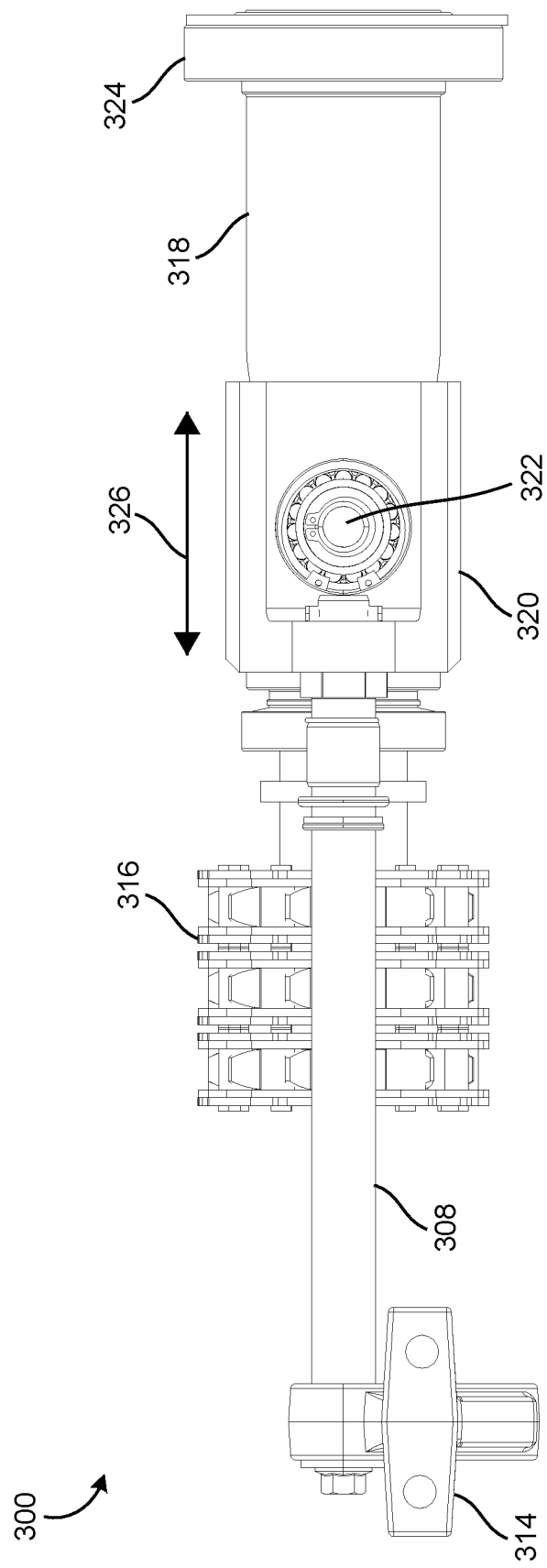
FIG. 5 is a partial front elevation view of the central knife drive gearbox of FIG. 3, according to some embodiments.

Referring now to FIGS. 4 and 5, perspective and detail views of the central knife drive gearbox 300 with the housing portions 302-306 removed are depicted, according to some embodiments. As shown, the output shafts 308 are coupled to cam follower housings 320 using any suitable fastening method (e.g., a pinned connection). Each cam follower housing 320 is configured to retain a cam follower 322 as it travels along a groove in a cam shaft 318. The geometry of the cam grooves is described in further detail below, with reference to FIGS. 6 and 7. The travel of the cam followers 322 within the cam grooves induces linear motion (i.e., as indicated by arrows 326 and 328) of the cam follower housings 320 alternatively towards or away from a cam shaft bearing support 324, which may be located at the approximate midpoint of the cam shaft 318.

Figure 8:
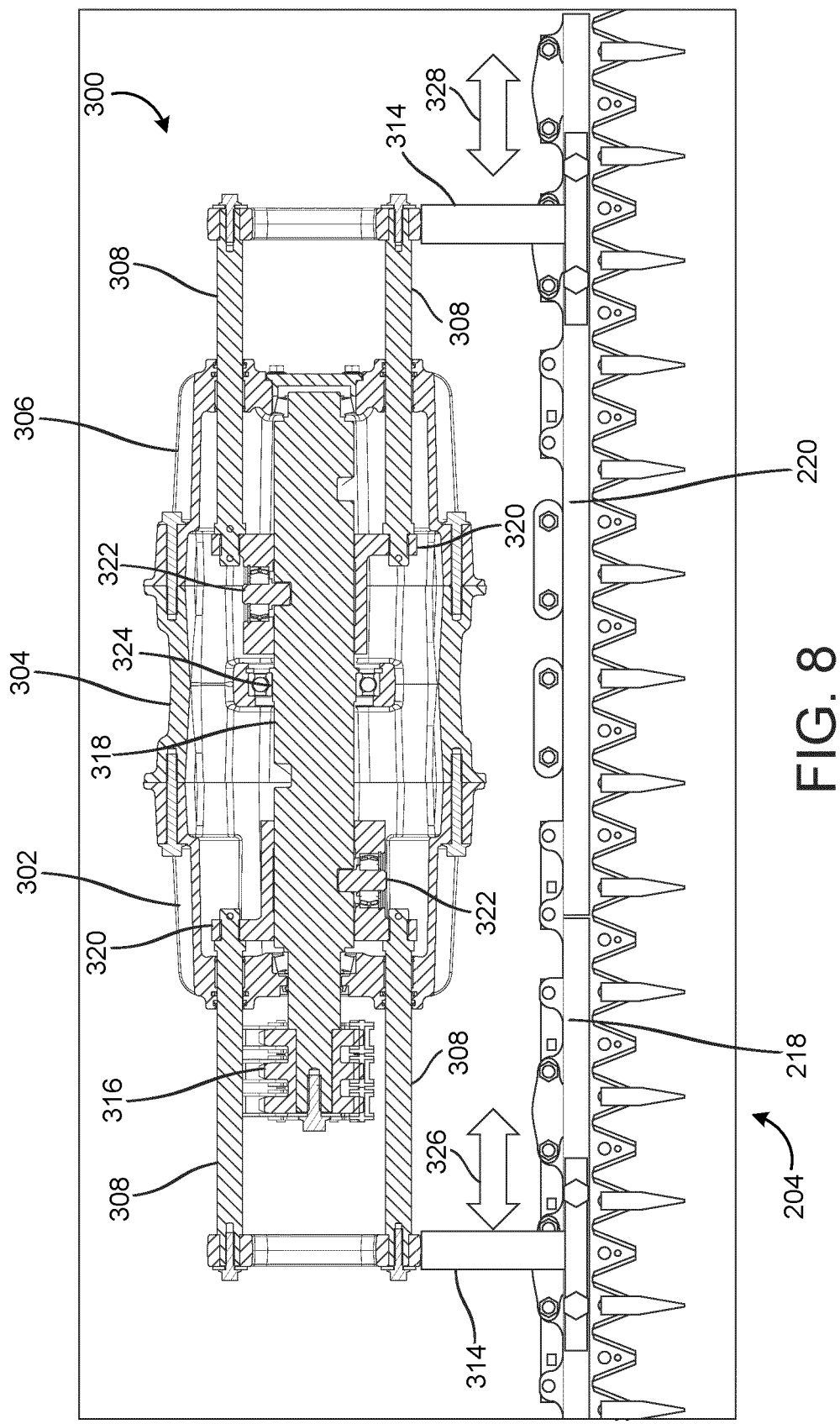
FIG. 8 is a top sectional view of a central knife drive gearbox and cutterbar assembly, according to some embodiments.

In some embodiments, the cam follower housings 320 are mounted within the gearbox 300 such that their movements are in phase, and the cam follower housings 320 are simultaneously moving in the same direction along the cam shaft 318. In other words, when one cam follower housing 320 is traveling towards the cam shaft bearing support 324, the other cam follower housing 320 is traveling away from the cam shaft bearing support 324. FIGS. 4 and 8 depict an in phase configuration of cam follower housings 320 within gearbox 300. In other embodiments, the cam follower housings 320 may be mounted within the gearbox 300 such that their movements are 180° out of phase, and the housings 320 are simultaneously moving in opposite directions along the cam shaft 318. An example of a gearbox in which the cam follower housings are 180° out of phase is included below with reference to FIGS. 10 and 11.

Figure 6:
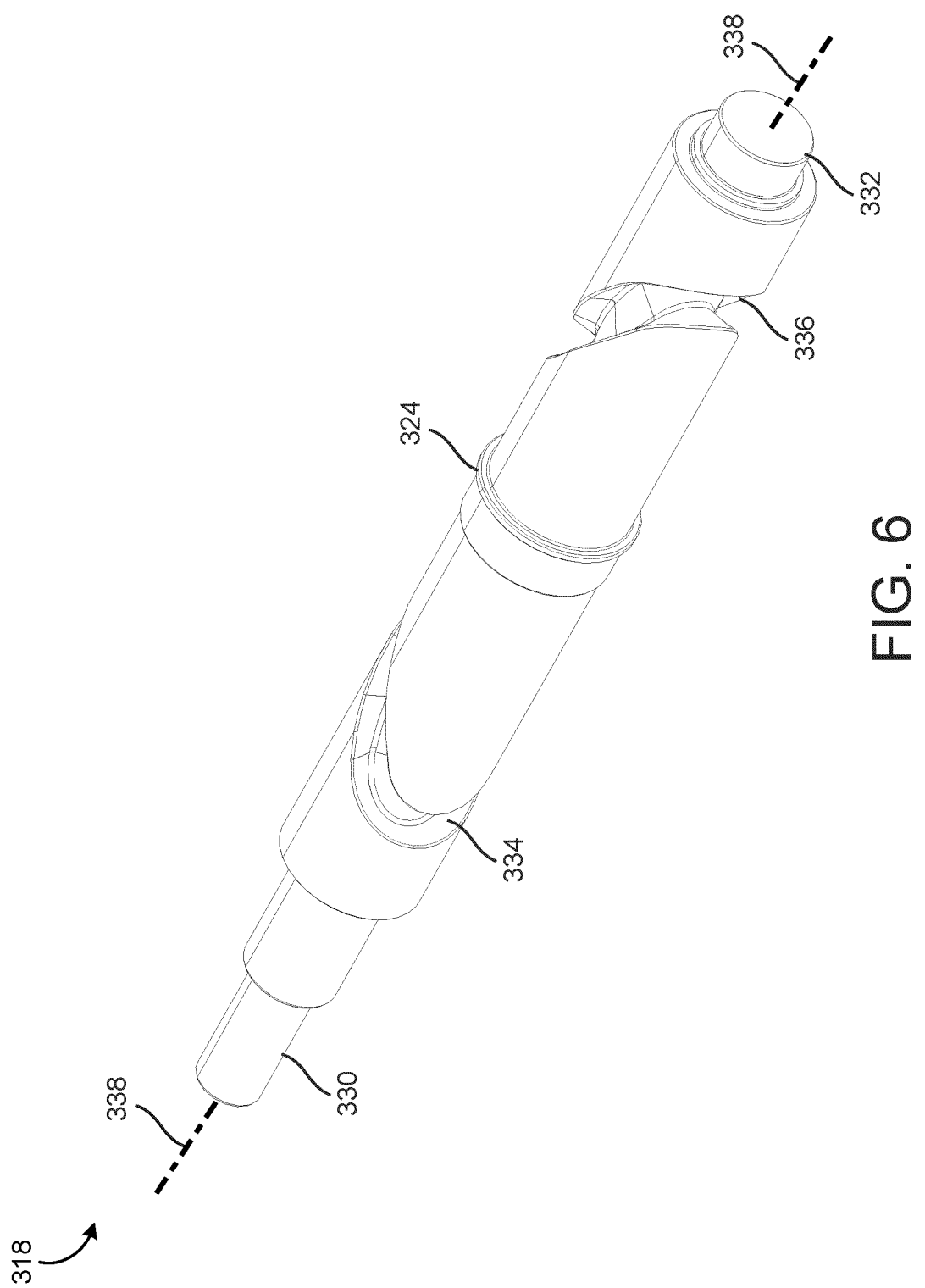
FIG. 6 is a perspective view of a self-reversing cam shaft used in the central knife drive gearbox of FIG. 3, according to some embodiments.
Figure 7:
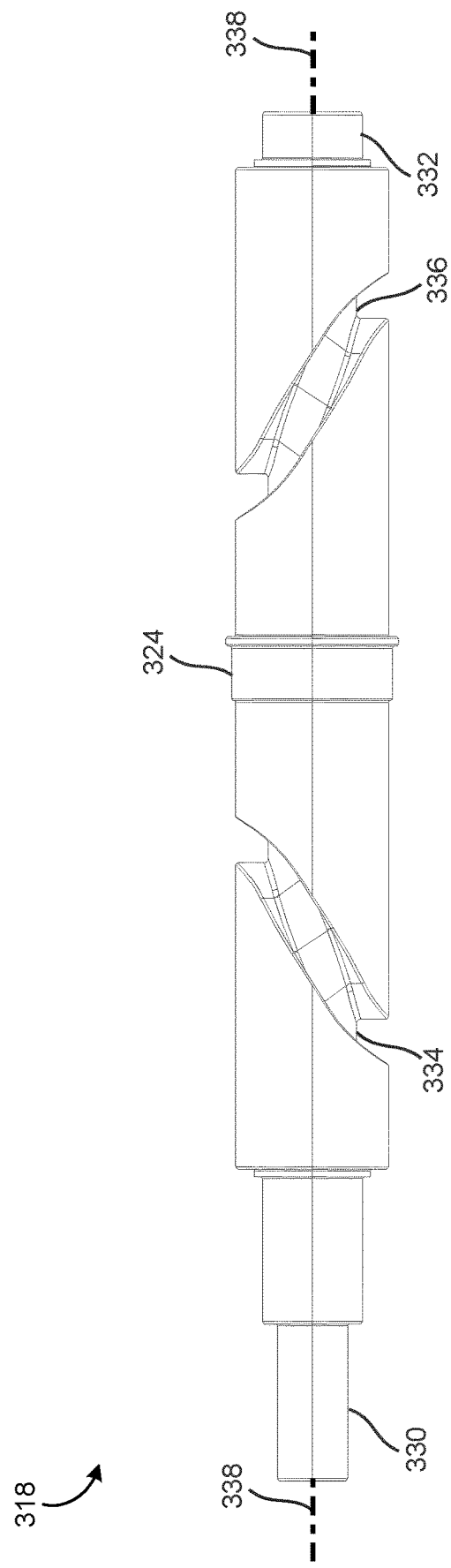
FIG. 7 is a front elevation view of the self-reversing cam shaft of FIG. 6, according to some embodiments.

Referring now to FIGS. 6 and 7, perspective and front elevation views of the self-reversing cam shaft 318 are depicted, according to some embodiments. Cam shaft 318 is shown to include a first end 330 and a second end 332. In some embodiments, the first end 330 is configured to couple to the drive mechanism (e.g., chain drive 316) and includes a sprocket-shaped portion to aid in coupling to the drive mechanism, while the second end 332 is configured to couple to a bearing assembly that supports and maintains the position of the cam shaft 318 as it rotates about the axis 338. As described above, the cam shaft bearing support 324 is located at the approximate midpoint of the first end 330 and the second end 332. In some embodiments, the bearing support 324 is used to maintain the position of the cam shaft 318 within the gearbox 300.

Cam shaft 318 further includes a first cam follower groove 334 and a second cam follower groove 336. Grooves 334 and 336 may extend along substantially the entire circumference of the cam shaft 318 and may have any dimensions or geometry (e.g., depth, width, cross-sectional profile) required to permit unobstructed travel of the cam followers 322. In some embodiments, the first cam follower groove 334 is symmetrical to the second cam follower groove 336 about a plane perpendicular to the rotational axis 338.

Turning now to FIG. 8, a top sectional view of the central knife drive gearbox 300 and cutterbar assembly 204 is depicted, according to some embodiments. As shown and as described above, drive mechanism 316 provides rotational drive input to the cam shaft 318. As cam shaft 318 rotates, cam followers 322 travel circumferentially about the cam shaft 318 in the cam follower grooves 334 and 336, resulting in linear reciprocating motion of the cam follower housings 320 and output shafts 308. This motion is transferred to a first cutterbar 218 and a second cutterbar 220 through the cutterbar head joint portions 314 which serve to couple the output shafts 308 to the cutterbars 218 and 220.

As described above, the first cutterbar 218 and the second cutterbar 220 may move (i.e., as indicated by arrows 326 and 328) in phase relative to each other. In other embodiments, the first cutterbar 218 and the second cutterbar 220 may be out of phase, and thus may move in opposite directions relative to each other. In either case, the cutterbars 218 and 220 may reach the zero velocity changes in direction at approximately the same points in time, which reduces vibrations which could affect the performance of the cutterbar assembly 204. In other embodiments, cutterbar assembly 204 includes a singular cutterbar that extends across substantially the entire length of the harvesting head 200. In the case of a single cutterbar, the output shafts 308 may be coupled using the joint portions 314 at a first mounting point and a second mounting point along the length of the cutterbar.

Figure 9:
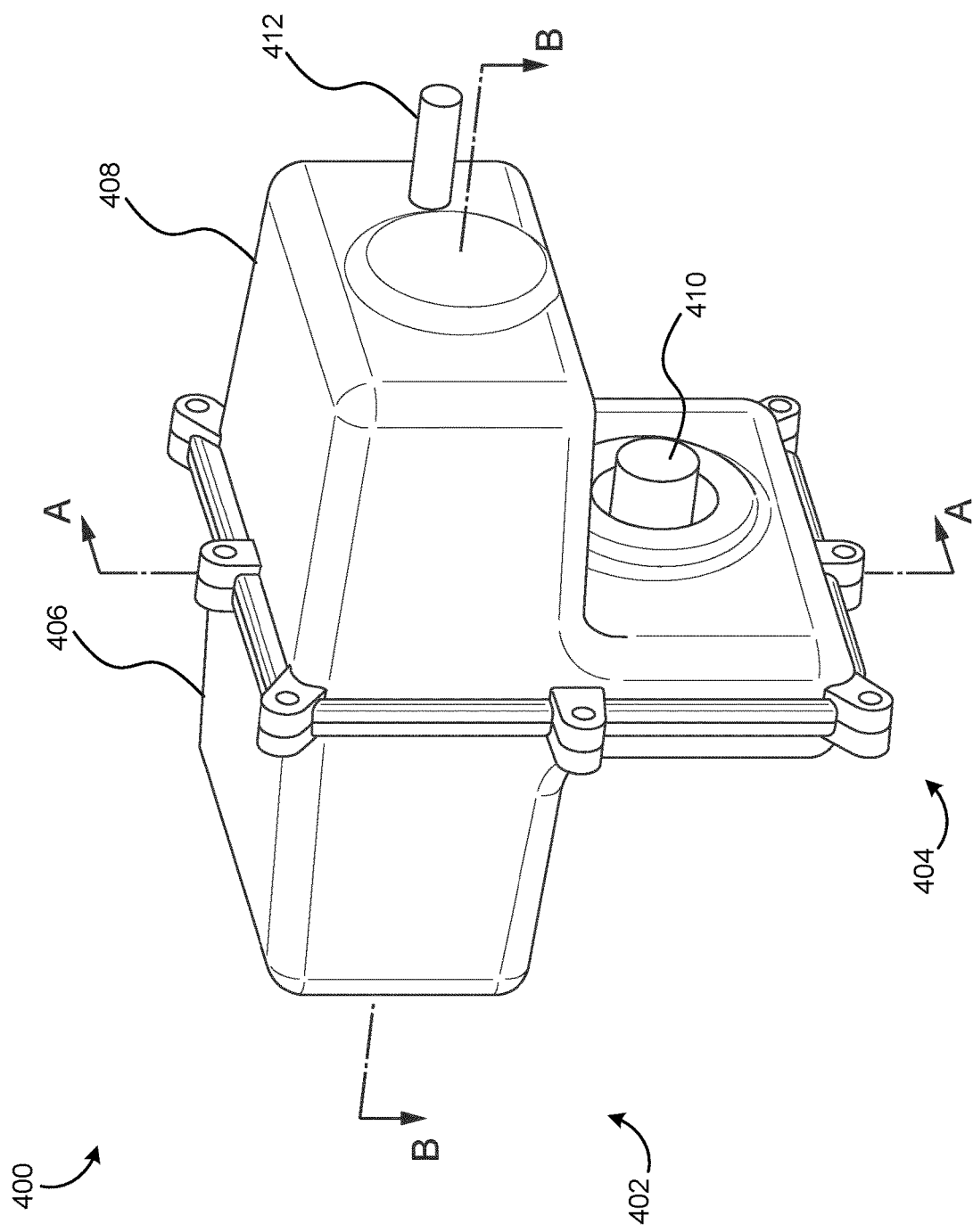
FIG. 9 is a perspective view of another embodiment of a central knife drive gearbox used in the agricultural harvester of FIG. 1, according to some embodiments.
Figure 10:
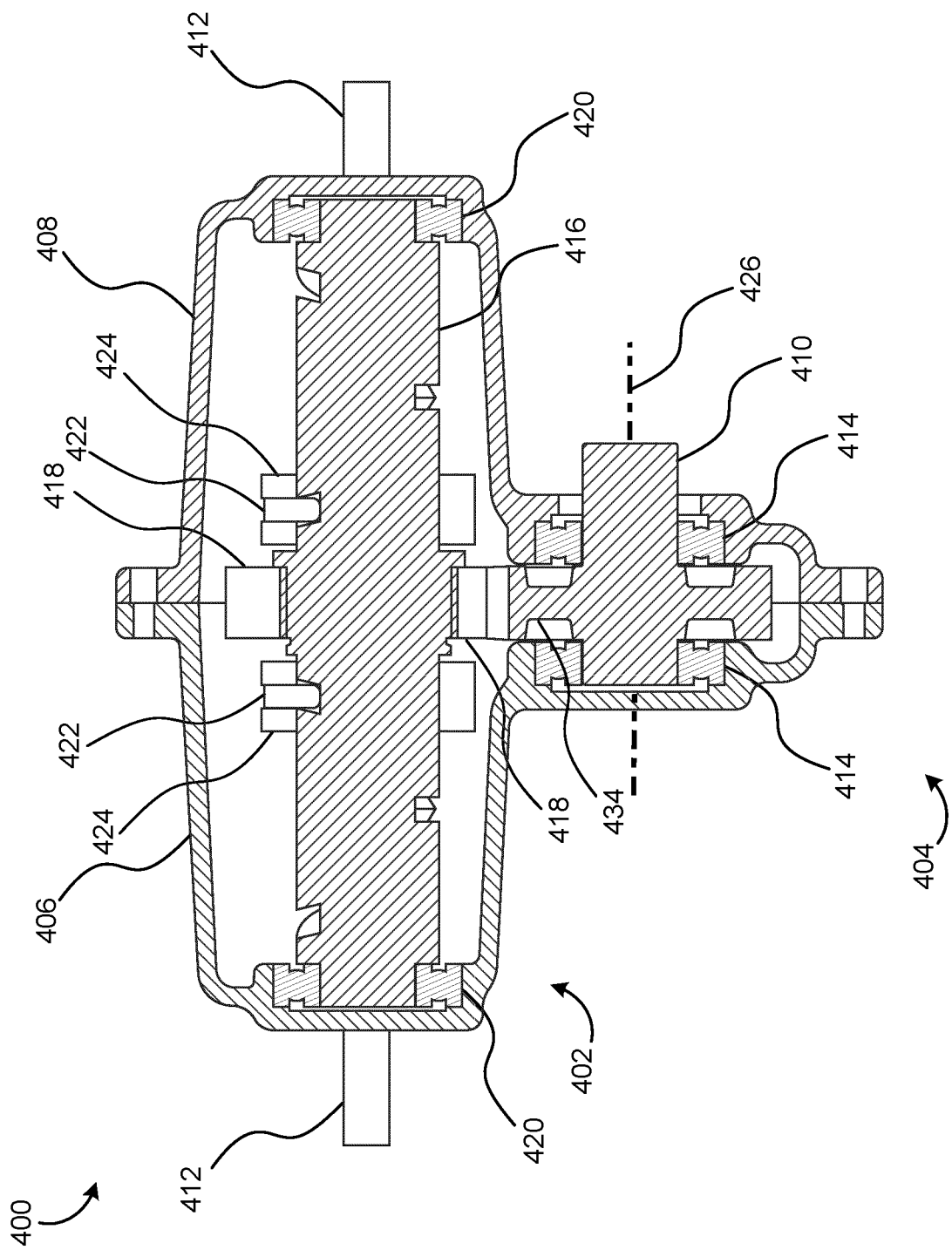
FIG. 10 is a sectional view of the central knife drive gearbox taken along the line A-A of FIG. 9, according to some embodiments.
Figure 11:
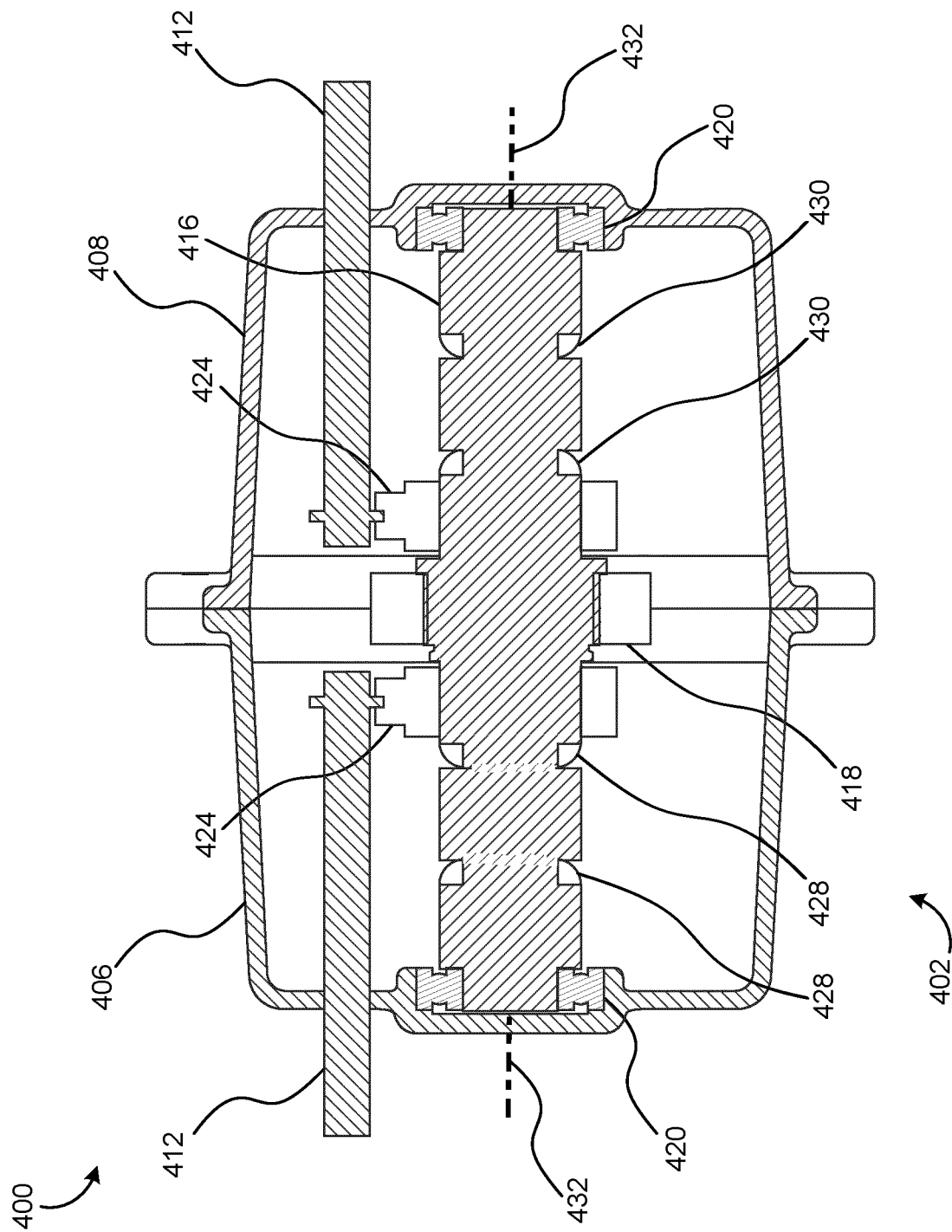
FIG. 11 is a sectional view of the central knife drive gearbox taken along the line B-B of FIG. 9, according to some embodiments.

Referring now to FIGS. 9-11, another embodiment of a central knife drive gearbox 400 for driving one or more cutterbars through reciprocating linear motion is shown. Specifically, FIG. 9 depicts a perspective view of the gearbox 400, FIG. 10 depicts a front sectional view of the gearbox 400 taken along the line A-A of FIG. 9, and FIG. 11 depicts a top sectional view of the gearbox 400 taken along the line B-B of FIG. 9. As shown, the central knife gearbox 400 includes a reciprocating output portion 402 and a rotational input portion 404. In contrast to gearbox 300, described above with reference to FIGS. 3-8, the rotational input portion 404 of gearbox 400 is located below the reciprocating portion 402, rather than along the rotational axis 432 of the self-reversing cam shaft 416. In some embodiments, because the overall width of the gearbox 400 is reduced due to the position of the drive mechanism, the gearbox 400 may be implemented in a harvesting head 200 in which the width of the space permitted for gearbox mounting is limited. Similarly, because the overall height of the gearbox 300 is reduced due to the position of the drive mechanism, the gearbox 300 may be implemented in a harvesting head 200 in which the height of the space available for gearbox mounting is limited.

The gearbox 400 is shown to include a first housing portion 406 and a second housing portion 408 that partially encapsulate an input power shaft 410 and the self-reversing cam shaft 416. The input power shaft 410 may be driven by any suitable type of drive mechanism (not shown). For example, in various embodiments, the input power shaft 410 may be driven by a chain drive, a gear drive, or a belt drive. The input power shaft 410 may be supported by bearings 414 that maintain the position of the input power shaft 410 in axial and/or radial directions as the input power shaft 410 rotates about an axis 426.

The input power shaft 410 may include a gear-shaped portion 434 configured to mesh with a cam shaft gear 418 to drive rotation of the cam shaft 416 about a cam shaft axis 432. In various embodiments, the gear-shaped portion 434 and the cam shaft gear 418 may include spur gears, bevel gears, or any other suitable type of gear geometry. Similar to the gearbox 300 described above with reference to FIGS. 3-8, the rotation of the cam shaft 416 is configured to drive reciprocating linear motion of cam follower housings 424 as cam followers 422 travel along cam follower grooves 428 and 430. In some embodiments, cam shaft 416 may be supported by bearings 420 that are situated at either end of the cam shaft 416. Cam follower housings 424 may be coupled to output shafts 412 that are in turn coupled to one or more cutterbars (e.g., first cutterbar 218 and second cutterbar 220, depicted above with reference to FIG. 8).

Figure 12:
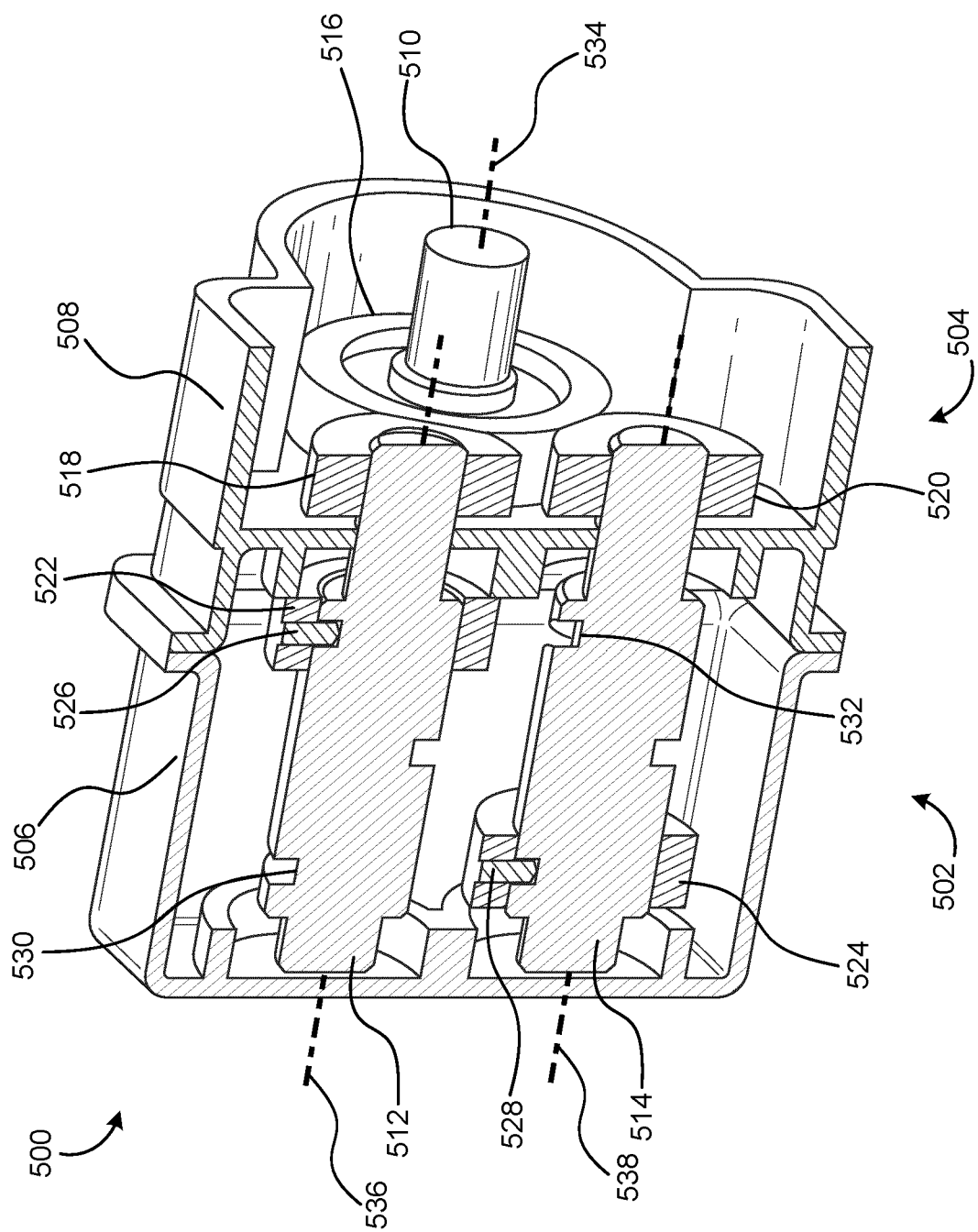
FIG. 12 is a sectional view of another embodiment of a central knife drive gearbox used in the agricultural harvester of FIG. 1, according to some embodiments.

Turning now to FIG. 12, another embodiment of a knife drive gearbox 500 for driving one or more cutterbars through reciprocating linear motion is shown in a sectional view. In contrast to gearboxes 300 and 400, gearbox 500 includes a first cam shaft 512 and a second cam shaft 514. In some embodiments, the lengths of the first cam shaft 512 and the second cam shaft 514 are substantially shorter than the lengths of the cam shafts 318 and 416 of gearboxes 300 and 400 respectively. For example, the first cam shaft 512 and the second cam shaft 514 may each be approximately half the length of either of cam shafts 318 and 416. Thus, the gearbox 500 may be implemented in a harvesting head 200 is which the width of the space permitted for gearbox mounting is limited.

As shown, the gearbox 500 includes a reciprocating portion 502 and a rotational input portion 504 formed by the coupling of a first housing portion 506 and a second housing portion 508. The rotational input portion 504 includes an input power shaft 510 that may be driven by any suitable type of drive mechanism (e.g., a chain drive, a gear drive, a belt drive, a pulley drive) to rotate about an axis 534. The input power shaft 510 may be coupled to an input gear 516, which simultaneously meshes with a first cam shaft gear 518 and a second cam shaft gear 520 drive rotation of the cam shafts 512 and 514 about axes 536 and 538 respectively. In various embodiments, gears 516-520 may be spur gears, bevel gears, or any other suitable type of gear. Rotation of the cam shafts 512 and 514 induces travel of cam followers 526 and 528 in cam grooves 530 and 532 respectively, which drives linear reciprocating motion of cam follower housings 522 and 524.

Although the central knife drives with self-reversing screws of the present disclosure are shown for use with a draper cutting platform, it is to be understood that the single knife drive of the present invention can be used with other types of wide agricultural cutters employing one or more cutterbars. It should be understood that the particular embodiments shown and discussed herein are not the only ways in which the invention can exist. They are the currently preferred embodiments of the invention. One skilled in the art of agricultural harvester and agricultural harvesting head design and manufacture can readily see other variations that would also fall within the scope of the appended claims.

What is claimed is:

1. A cutting assembly for an agricultural harvesting head, comprising:
a first cutterbar;
a second cutterbar;
a knife drive gearbox configured to drive linear reciprocating motion of the first cutterbar and the second cutterbar, the knife drive gearbox comprising:
a cam shaft extending along a rotational axis from a first end to a second end, the cam shaft having a first cam follower groove located proximate the first end and a second cam follower groove located proximate the second end;
a drive mechanism configured to drive rotation of the cam shaft about the rotational axis;
a first reciprocating output shaft coupled to a first cam follower housing retaining a first cam follower configured to travel in the first cam follower groove, wherein the first reciprocating output shaft, the first cam follower housing, and the first cam follower travel in a same direction; and
a second reciprocating output shaft coupled to a second cam follower housing retaining a second cam follower configured to travel in the second cam follower groove, wherein the second reciprocating output shaft, the second cam follower housing, and the second cam follower travel in a same direction;
wherein the first reciprocating output shaft is coupled to the first cutterbar and the second reciprocating output shaft is coupled to the second cutterbar.

2. The cutting assembly of claim 1, wherein the drive mechanism is coupled to the first end of the cam shaft.

3. The cutting assembly of claim 1, wherein the drive mechanism is disposed beneath the cam shaft between the first end and the second end.

4. The cutting assembly of claim 1, wherein the knife drive gearbox drives the first cutterbar and the second cutterbar in opposite directions relative to each other during operation.

5. The cutting assembly of claim 1, wherein the knife drive gearbox drives the first cutterbar and the second cutterbar in the same direction relative to each other during operation.

6. The cutting assembly of claim 1, wherein the drive mechanism comprises at least one of a chain drive mechanism, a gear drive mechanism, and a belt drive mechanism.

7. The cutting assembly of claim 1, wherein the first cam follower groove is symmetrical to the second cam follower groove.

8. The cutting assembly of claim 1, further comprising a third output shaft and a fourth output shaft, wherein the third output shaft is coupled to the first cutterbar and the fourth output shaft is coupled to the second cutterbar.

9. An agricultural harvesting head, comprising:
a frame that extends laterally;
a belt conveyor configured to be supported on the frame and driven in a lateral direction; and
a cutting assembly configured to be supported on the frame, comprising:
a cutterbar that extends laterally; and
a knife drive gearbox configured to drive linear reciprocating motion of the cutterbar, the knife drive gearbox comprising:
a cam shaft extending along a rotational axis from a first end to a second end, the cam shaft having a first cam follower groove located proximate the first end and a second cam follower groove located proximate the second end;

a drive mechanism configured to drive rotation of the cam shaft about the rotational axis;

a first reciprocating output shaft coupled to a first cam follower housing retaining a first cam follower configured to travel in the first cam follower groove, wherein the first reciprocating output shaft, the first cam follower housing, and the first cam follower travel in a same direction; and a second reciprocating output shaft coupled to a second cam follower housing retaining a second cam follower configured to travel in the second cam follower groove, wherein the second reciprocating output shaft, the second cam follower housing, and the second cam follower travel in a same direction;

wherein the first reciprocating output shaft is coupled to the cutterbar at a first mounting point and the second reciprocating output shaft is coupled to the cutterbar at a second mounting point.

10. The agricultural harvesting head of claim 9, wherein the drive mechanism is coupled to the first end of the cam shaft.

11. The agricultural harvesting head of claim 9, wherein the drive mechanism is disposed beneath the cam shaft between the first end and the second end.

12. The agricultural harvesting head of claim 9, wherein the drive mechanism comprises at least one of a chain drive mechanism, a gear drive mechanism, and a belt drive mechanism.

13. The agricultural harvesting head of claim 9, wherein the cutting assembly further comprises a third output shaft coupled to the cutterbar at the first mounting point and a fourth output shaft coupled to the cutterbar at the second mounting point.

14. A method of operating a cutting assembly for an agricultural harvesting head, comprising:

providing a first cutterbar;

providing a second cutterbar;

providing a knife drive gearbox configured to drive linear reciprocating motion of the first cutterbar and the second cutterbar, the knife drive gearbox comprising:

a cam shaft extending along a rotational axis from a first end to a second end, the cam shaft having a first cam follower groove located proximate the first end and a second cam follower groove located proximate the second end;

a drive mechanism configured to drive rotation of the cam shaft about the rotational axis;

a first reciprocating output shaft coupled to a first cam follower housing retaining a first cam follower configured to travel in the first cam follower groove, wherein the first reciprocating output shaft, the first cam follower housing, and the first cam follower travel in a same direction; and a second reciprocating output shaft coupled to a second cam follower housing retaining a second cam follower configured to travel in the second cam follower groove, wherein the second reciprocating output shaft, the second cam follower housing, and the second cam follower travel in a same direction;

wherein the first reciprocating output shaft is coupled to the first cutterbar and the second reciprocating output shaft is coupled to the second cutterbar.

15. The method of claim 14, wherein the drive mechanism is coupled to the first end of the cam shaft.

16. The method of claim 14, wherein the drive mechanism is disposed beneath the cam shaft between the first end and the second end.

17. The method of claim 14, wherein the knife drive gearbox drives the first cutterbar and the second cutterbar in opposite directions relative to each other during operation.

18. The method of claim 14, wherein the knife drive gearbox drives the first cutterbar and the second cutterbar and the same direction relative to each other during operation.

19. The method of claim 14, wherein the drive mechanism comprises at least one of a chain drive mechanism, a gear drive mechanism, and a belt drive mechanism.

20. The method of claim 14, wherein the knife drive gearbox further comprises a third output shaft coupled to the first cutterbar and a fourth output shaft coupled to the second cutterbar.

* * * * *